(12) United States Patent
Gruber-Nadlinger et al.

(10) Patent No.: US 8,253,791 B2
(45) Date of Patent: Aug. 28, 2012

(54) MONITORING DEVICE

(75) Inventors: Thomas Gruber-Nadlinger, Langenrohr (AT); Armin Bauer, St. Pölten (AT)

(73) Assignee: Voith Patent GmbH, Heidenheim (DE)

( * ) Notice: Subject to any disclaimer, the term of this patent is extended or adjusted under 35 U.S.C. 154(b) by 894 days.

(21) Appl. No.: 12/188,448

(22) Filed: Aug. 8, 2008

(65) Prior Publication Data
US 2009/0033743 A1 Feb. 5, 2009

Related U.S. Application Data

(63) Continuation of application No. PCT/EP2007/050574, filed on Jan. 22, 2007.

(30) Foreign Application Priority Data

Feb. 9, 2006 (DE) .................. 10 2006 005 911

(51) Int. Cl.
*H04N 7/18* (2006.01)
*H04N 9/47* (2006.01)
(52) U.S. Cl. ............... 348/86; 348/92; 348/125
(58) Field of Classification Search ............ 348/86, 348/92, 125
See application file for complete search history.

(56) References Cited

U.S. PATENT DOCUMENTS

| | | | |
|---|---|---|---|
| 4,560,931 A * | 12/1985 | Murakami et al. | 324/220 |
| 5,046,903 A * | 9/1991 | Nagayoshi et al. | 409/143 |
| 5,285,689 A * | 2/1994 | Hapstack et al. | 73/623 |
| 6,913,390 B2 * | 7/2005 | Inoue et al. | 384/476 |
| 2008/0020147 A1 * | 1/2008 | Tullett et al. | 427/474 |

FOREIGN PATENT DOCUMENTS

| | | |
|---|---|---|
| JP | 2000056367 | 2/2000 |
| JP | 2004333534 | 11/2004 |
| JP | 2005096091 | 4/2005 |
| WO | 2005096091 A1 | 10/2005 |

OTHER PUBLICATIONS

International Search Report dated Jul. 3, 2007 for PCT/EP2007/050574 (2 pages).
English translation of International Preliminary Report on Patentability dated Sep. 9, 2008 for PCT/EP2007/050574 (5 pages).
English translation of Written Opinion of the International Searching Authority (undated) for PCT/EP2007/050574 (4 pages).

* cited by examiner

*Primary Examiner* — Kristie Shingles
(74) *Attorney, Agent, or Firm* — Taylor IP, P.C.

(57) ABSTRACT

A device for monitoring objects, in particular for monitoring industrial environments, such as paper mills and manufacturing and/or finishing processes of a paper, board or other fibrous web being carried out therein, includes a monitoring camera, the camera with its objective being arranged in a rotationally symmetrical protective housing rotating about an axis of rotation, and a protective housing to be mounted at its one end on a rigid hollow shaft and, at its coaxially opposite other end, to have a co-rotating blower pipe or merge into the latter, and for compressed air to be applied to the protective housing, including the blower pipe.

17 Claims, 1 Drawing Sheet

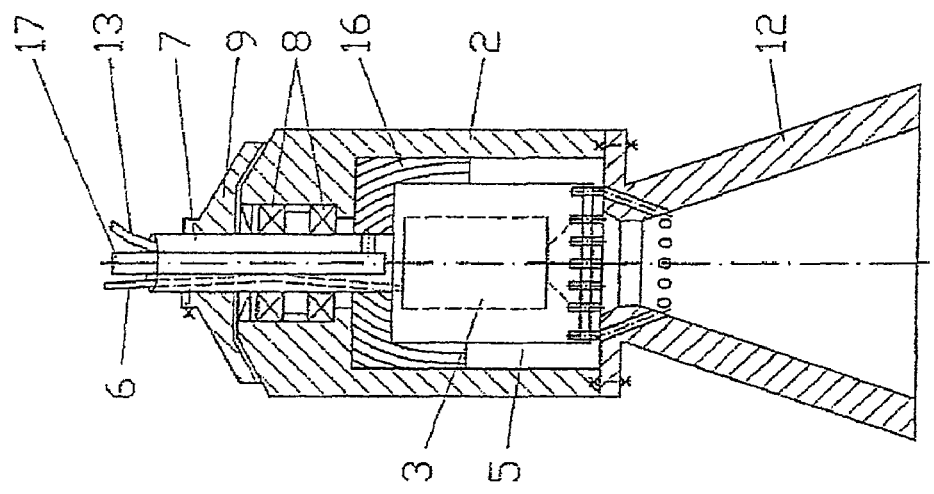
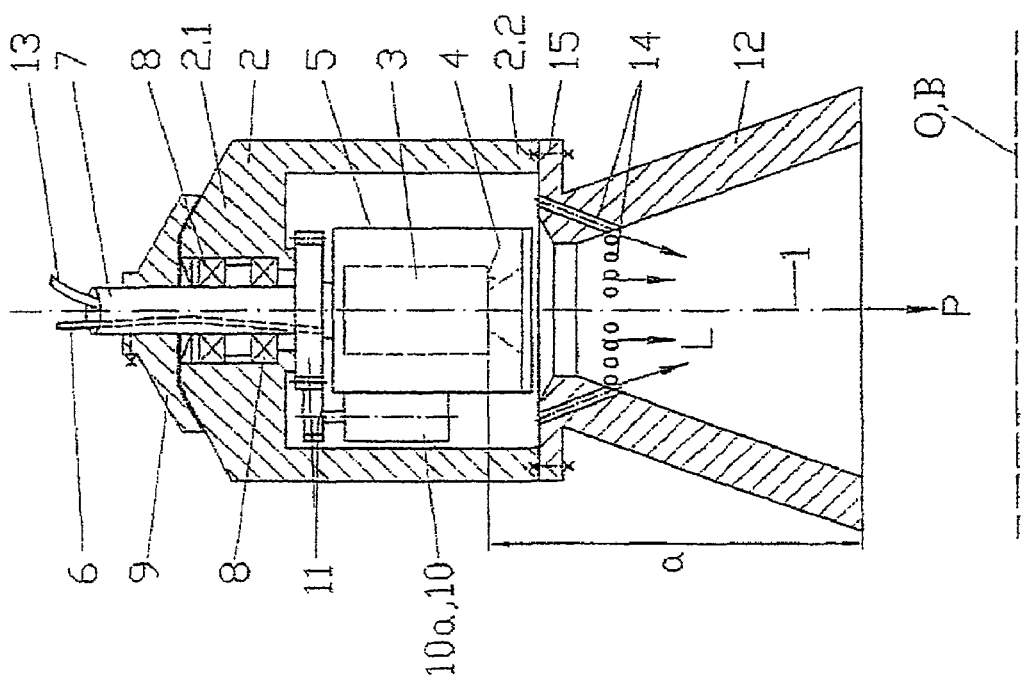

MONITORING DEVICE

CROSS REFERENCE TO RELATED APPLICATIONS

This is a continuation of PCT application No. PCT/EP2007/050574, entitled "MONITORING DEVICE", filed Jan. 22, 2007, which is incorporated herein by reference.

BACKGROUND OF THE INVENTION

1. Field of the Invention

The invention relates to a device for monitoring objects, in particular for monitoring industrial environments, such as paper mills and manufacturing and/or finishing processes of a paper, board or other fibrous web being carried out therein, including at least one monitoring camera or at least one sensor, which is arranged in a protective housing rotating about an axis of rotation.

2. Description of the Related Art

Monitoring devices of this type for use in rough industrial environments, such as the aforesaid paper mills, are necessary and in principle already known from the prior art. The protective housings used in this case are provided with stationary blower pipes which can be fitted and which are intended to keep the optical path between a camera and the desired object to be monitored free of dirt particles and spray mists. In very rough environments, which is to say in particular where high moisture, thermal and/or dirt loadings are present, an air knife, as it is known, is often additionally fitted to the blower pipe. This air knife improves the maintenance of the cleanliness of the interior of the blower pipe. This housing system is known in specialist paper sector circles as the "WebView System from the Papertech Company".

However, experience has shown that, despite the provision of protective fittings, particles and droplets can penetrate into the interior of the blower pipe and can soil the camera objective or a protective glass pane fitted in front of the latter. In addition, the aforementioned device keeps only the optical path between camera and object free but not the protective housing itself. Deposits of dirt on the exterior of the housing constitute a potential hazard for specific applications. For instance, if a monitoring camera is to be fitted above the moving paper web in a paper mill, then lumps formed on the housing could be detached, fall onto the paper web and cause a web break, which is associated with a stoppage of the machine and therefore considerable production outage. As a rule, cameras in such positions must therefore be observed continuously and cleaned at regular intervals. Firstly, this results in considerable expenditure on maintenance; secondly, as a result, the area of application is limited only to points which are easily accessible. In addition, unsupervised continuous operation of the camera is not possible in this case.

A device having a self-cleaning protective housing is disclosed by WO-A1-2005/096091. In this document, a housing is described which is constructed in the manner of a dome and completely sealed. The housing rotates around the camera. The centrifugal force produced as a result is intended to ensure the action removing dirt or repelling dirt.

There are specific applications for which this concept described is not suitable, such as the use over a moving material web. Paper webs in modern plants are already running at a speed of up to 2000 m/min and more, for which reason the monitoring device cannot be brought close to the web, since otherwise aerodynamic effects endangering production would occur.

On the other hand, were the closed housing described to be fitted at a safe distance from the web, the optical path between camera and object could not be kept free of particles or spray mists. In addition, this type of housing is not capable of removing relatively large sticky dirt particles in the region of the axis of rotation, since the centrifugal forces are too low.

What is needed in the art is a device for monitoring objects which has a self-cleaning protective housing and permits a free optical path between camera or sensor and an object to be monitored better than hitherto and additionally can be used in continuous operation.

SUMMARY OF THE INVENTION

The present invention provides a protective housing which is mounted at its one end on a rigid shaft and, at its coaxially opposite other end, has a co-rotating blower pipe or merges into the latter. Compressed air can be applied to the protective housing, including the blower pipe.

The rotating protective housing with blower pipe has the advantage that particles or droplets that are deposited are removed by the centrifugal action or even cannot be deposited in the first place as a result of immediate deflection when they strike the protective housing.

The blower pipe has the particular advantage that the optical path between camera or sensor and the object to be monitored remains free of particles and spray mists at any time, since a barrier action is achieved by the air stream both in the interior of the blower pipe and in front of the latter. This in turn makes it possible to mount the monitoring camera or at least one sensor at a specific safe distance from the object to be monitored.

As a result, it is also possible to monitor a fast-moving web. In addition, unsupervised continuous operation of the monitoring device is possible for the first time.

A further advantageous solution consists in the shaft being designed as a hollow shaft and supply connections for the camera or the sensor or the sensors and, if desired, also feed lines for the compressed air being accommodated in the hollow shaft. The result is a compact monitoring device that is less susceptible to disruption. It goes without saying that the compressed air can also be led directly into the housing from outside instead of being led in via the hollow shaft.

Incidentally, the compressed air can easily be led into the interior of the blower pipe via drilled holes which are introduced into the protective housing and/or into the wall of the blower pipe. However, it is also possible to lead the compressed air past the inner housing instead of the supply via the drilled holes.

It is very advantageous if the cross section of the blower pipe widens in the manner of a funnel over its length. The cross section of the blower pipe can widen frusto-conically. The widening or an enlarged diameter is found in the direction facing away from the camera. Instead of the funnel shape, other forms are also possible, such as an S shape.

The shape of the blower pipe, advantageously opening toward the bottom, has the advantage that any penetrating particles and droplets which are deposited on the wall and on the camera protective glass pane or the camera objective or on the sensor or sensors can be removed more easily from the interior of the blower pipe by the component of the centrifugal force, which is then likewise oriented downward.

A further expedient solution can consist in arranging the camera additionally in a stationary inner and sealed housing. As a result, the camera is still better protected but has the disadvantage that condensate can form in the event of temperature and humidity fluctuations. As a result of the arrangement of the aforesaid blower pipe, the inner housing can therefore be dispensed with under certain circumstances.

It is also possible not to shield the inner housing but to configure the latter to be open and to place it under positive pressure.

Likewise, it is not necessary to cover the camera by way of a rotating glass pane, as in many embodiments from the prior art, since the blown air from the blower pipe according to the invention deflects incident particles very reliably away from the camera objective glass pane or the sensor objective and the funnel-like blower pipe wall.

Alternately, however, it is nevertheless possible to close the blower pipe with a glass pane or plate at its end pointing toward the rotating housing.

The monitoring camera or a sensor that is provided can be arranged coaxially with respect to the inner housing and/or the outer protective housing. As a result, the device can be mounted more easily.

The compressed or blown air used is also used to cool the devices located in the housing, such as camera, sensor and motor. It is therefore possible to use pre-cooled compressed air.

In specific cases, it may be expedient to arrange the camera or sensor eccentrically inside the rotating protective housing. An additional cleaning effect can be achieved as a result of the higher centrifugal forces occurring outside the axis of rotation.

In addition, the drive device present for the purpose of rotating the protective housing and the blower pipe can be arranged centrally or else eccentrically with respect to the axis of rotation and depends in particular on the respective space and the type of drive.

For instance, an electrically operated external rotor motor can be used in a straightforward manner. Likewise expediently, the arrangement of fan blades which are operated by flow effects can be used as a drive.

This means that the drive device can operate in a hydraulic, electric or pneumatic way.

However, a turbine operated by compressed air can also be provided as a drive device, as explained above with the same effect.

A further advantageous refinement of the invention can consist in the surfaces of the rotating protective housing, expediently fabricated as a rotationally symmetrical part, being provided with a non-stick coating and/or with elements used to deflect contaminants, such as flutes. As a result, a desired direction of the outgoing dirt can be achieved.

In addition, it is advantageous if the housing is fabricated from a non-corroding material.

It should be added that the housing can also be designed non-rotationally symmetrically but external fittings which compensate for imbalances can also be provided for the purpose.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 shows a first embodiment of the solution according to the present invention; and FIG. 2 shows a second embodiment of the present invention.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

In the figures, identical or identically acting components are provided with the same designation.

FIG. 1 shows, in a first embodiment of the present invention, a monitoring device that is arranged vertically and acts in a direction pointing vertically downward, having a protective housing 2 that is rotationally symmetrical about an axis of rotation 1. In this protective housing 2, a monitoring camera 3 with its objective 4 (could also contain at least one sensor instead of the camera, however) is likewise arranged on the same axis of rotation 1. In addition, the camera 3 used here is accommodated in a sealed inner housing 5. At least one supply connection 6 for the camera 3 is led to the camera 3 through a rigid hollow shaft 7 used here.

It should be noted that the power supply could be provided via wiping contacts and the camera could also be operated under remote control. Therefore, a rigid solid shaft could also be used. In addition, a fan fitted in the interior of the housing could also ensure the intake of air.

At its one end 2.1, the protective housing 2 is mounted such that it can rotate on the rigid hollow shaft 7 used here, as stated. The bearing provided is a ball bearing 8. As protection for the bearing 8, a protective cap 9 engaging around the hollow shaft 7 is placed on the protective housing 2.

The protective housing 2 can be set rotating by a drive device 10, which is to say here by an electric motor 10a and gear wheels 11. As a result, high centrifugal forces are produced. With the aid of compressed air, which is led into the interior of the protective housing 2 via at least one supply connection 13, and the aforesaid centrifugal forces, deposited particles or droplets are removed or can even not be deposited there as a result of immediate deflection when they strike the protective housing 2.

Mounted on the other end 2.2 of the protective housing 2 is a funnel-like blower pipe 12, which is supplied with the compressed air from the housing 2 via drilled holes 14. The blower pipe 12 opens toward the bottom. In other words: the cross section of the blower pipe widens in an advantageous way over its entire length. The widening or an enlarged diameter is located in the direction facing away from the objective 4 of the camera 3. The shape of the blower pipe 12, advantageously opening toward the bottom, has the advantage that any penetrating particles and droplets which are deposited on the wall and on a camera protective glass pane that is present or the camera objective can be removed more easily from the interior of the blower pipe by the component of the centrifugal force which is then likewise oriented downward.

In FIG. 1, it can be seen that the blower pipe 12 is connected to the protective housing 2 by way of screw connections 15.

With the arrangement of the blower pipe 12, the optical path (see arrow P) between monitoring camera 3 and the object O to be monitored, indicated by dashed lines, which in the example is intended to be a fast-moving paper web B, remains continuously free of particles and spray mists. By way of the air stream L, a barrier effect is achieved both in the interior of the blower pipe 12 and in front of the latter. This in turn makes it possible to mount the monitoring camera 3 at a specific safe distance a from the object to be monitored, so that the fast-moving web B can be observed unsupervised and in continuous operation.

It should also be mentioned that the hollow shaft 7 also accommodates the supply connection 13 for the compressed air.

The inner and outer surface of the protective housing 2 can additionally be provided with a non-stick coating, for example with Teflon, in order to reinforce the dirt-repelling effect.

In addition, there is the possibility of applying specific shapes, such as flutes, to or in the surface of the housing, in order to control the direction of the outgoing dirt. However, this is not illustrated in the figure.

A further design variant is shown in FIG. 2. The embodiment corresponds in principle to that according to FIG. 1. Therefore, only the differences are to be explained here. In FIG. 2, instead of the electric motor 10 from FIG. 1, a pneumatic drive (propeller or turbine 16 driven by compressed air) is used. A compressed air supply 17 for the drive of the turbine 16 and a compressed air supply 13 for the housing 2 should in this case be controlled separately.

It should be added that the drive devices 10 and 16 for the protective housing 2 are located in the interior of the housing 3 and as a result are less susceptible to dirt and disruption.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF DESIGNATIONS

1 Axis of rotation
2 Protective housing
2.1 One end
2.2 Other end
3 Monitoring camera, sensor
4 Objective
5 Inner housing
6 Supply connection
7 Shaft, hollow shaft
8 Ball bearing
9 Protective cap
10 Drive
11 Gear wheels
12 Blower pipe
13 Supply connection
14 Drilled hole
15 Screw connection
16 Turbine
a Safe distance
B Paper web
O Object
L Air stream
P Optical path

What is claimed is:

1. A device for monitoring objects in industrial environments, said device comprising:
   a protective housing including a first end and a second end which is coaxially opposite said first end, said protective housing having a radial center axis and rotating about an axis of rotation which is coincident with said radial center axis;
   one of a monitoring camera and at least one sensor, one of said monitoring camera and said at least one sensor being arranged in said protective housing rotating about said axis of rotation; and
   a rigid shaft, said protective housing being mounted at said first end on said rigid shaft, said protective housing at said second end one of having a co-rotating blower pipe and merging into said co-rotating blower pipe, said protective housing and said blower pipe configured for compressed air being applied thereto.

2. The device as claimed in claim 1, further comprising at least one first supply connection, said rigid shaft being hollow-cylindrical and accommodating at least one said first supply connection for one of said monitoring camera and said at least one sensor.

3. The device as claimed in claim 2, further comprising at least one second supply connection, said rigid shaft accommodating at least one said second supply connection for said compressed air.

4. The device as claimed in claim 1, wherein said blower pipe has an interior configured for receiving therein said compressed air via a plurality of drilled holes formed in at least one of said protective housing and said blower pipe.

5. The device as claimed in claim 1, wherein said blower pipe has a cross-section which widens in the manner of a funnel.

6. The device as claimed in claim 1, further comprising a stationary, sealed, inner housing, one of said monitoring camera and said at least one sensor being arranged in said inner housing.

7. The device as claimed in claim 6, wherein one of said monitoring camera and said at least one sensor is arranged coaxially with respect to at least one of said inner housing and said protective housing.

8. The device as claimed in claim 1, wherein one of said monitoring camera and said at least one sensor is arranged eccentrically inside said protective housing.

9. The device as claimed in claim 1, further comprising a drive device which is arranged centrally with respect to said axis of rotation.

10. The device as claimed in claim 9, wherein said drive device is arranged eccentrically with respect to said axis of rotation.

11. The device as claimed in claim 9, wherein said drive device operates in one of a hydraulic, an electric, and a pneumatic way.

12. The device as claimed in claim 9, wherein said drive device is a turbine which is one of operated by said compressed air and blown externally.

13. The device as claimed in claim 1, wherein said protective housing includes a plurality of surfaces which include at least one of a non-stick coating and a plurality of elements used to deflect a plurality of contaminants away.

14. The device as claimed in claim 13, wherein said plurality of elements are a plurality of flutes.

15. The device as claimed in claim 1, further including a plurality of bearings between said protective housing and said rigid shaft, said protective housing configured for rotating about said rigid shaft by way of said plurality of bearings.

16. The device as claimed in claim 15, wherein said rigid shaft is nonrotating and is stationary relative to said protective housing.

17. The device as claimed in claim 1, wherein the device is for monitoring a fibrous web, the fibrous web being at least one of a paper web and a board web.

\* \* \* \* \*